United States Patent
Xuan

(10) Patent No.: US 9,280,665 B2
(45) Date of Patent: Mar. 8, 2016

(54) FAST AND ACCURATE IDENTIFICATION OF MESSAGE-BASED API CALLS IN APPLICATION BINARIES

(71) Applicant: AirWatch LLC, Atlanta, GA (US)

(72) Inventor: Chaoting Xuan, Duluth, GA (US)

(73) Assignee: AIRWATCH LLC, Atlanta, GA (US)

( * ) Notice: Subject to any disclaimer, the term of this patent is extended or adjusted under 35 U.S.C. 154(b) by 0 days.

(21) Appl. No.: 14/498,486

(22) Filed: Sep. 26, 2014

(65) Prior Publication Data

US 2015/0161390 A1    Jun. 11, 2015

Related U.S. Application Data

(60) Provisional application No. 61/914,772, filed on Dec. 11, 2013.

(51) Int. Cl.
G06F 21/57    (2013.01)

(52) U.S. Cl.
CPC ..................................... *G06F 21/57* (2013.01)

(58) Field of Classification Search
CPC ..................................................... G06F 21/57
See application file for complete search history.

(56) References Cited

U.S. PATENT DOCUMENTS

| | | | | |
|---|---|---|---|---|
| 5,920,720 A | * | 7/1999 | Toutonghi | G06F 9/443 712/E9.084 |
| 6,026,235 A | * | 2/2000 | Shaughnessy | G06F 11/3466 714/E11.2 |
| 6,317,873 B1 | * | 11/2001 | Townsend | G06F 8/53 717/142 |
| 6,546,454 B1 | * | 4/2003 | Levy | G06F 9/44589 711/156 |
| 6,804,682 B1 | * | 10/2004 | Kemper | G06F 8/72 |
| 2013/0287208 A1 | * | 10/2013 | Chong | G05B 19/0426 380/44 |

OTHER PUBLICATIONS

Alex Ruiz, Integrate an External Code Checker into Eclipse CDT, published Aug. 22, 2012, retrieved from http://www.ibm.com/developerworks/library/j-codan/.*
U.S. Appl. No. 14/498,115, filed Sep. 26, 2014, and entitled "Risk Assessment for Managed Client Devices".
U.S. Appl. No. 61/877,623, filed Sep. 13, 2013, and entitled "Software Application Scanning and Reputation Analysis."

\* cited by examiner

*Primary Examiner* — Chau Le
(74) *Attorney, Agent, or Firm* — Thomas | Horstemeyer, LLP

(57) ABSTRACT

Disclosed are various embodiments for fast and accurate identification of message-based application programming interface (API) calls in Objective-C binaries. An application binary is analyzed to determine a first listing of classes and a first listing of methods. Metadata is extracted from the application to determine a second listing of classes and a second listing of methods. A listing of external classes and a listing of external methods are determined. Data identifying public API definitions is obtained. Public APIs invoked by the application are determined by comparing the external classes and methods with the public API definitions.

19 Claims, 7 Drawing Sheets

FAST AND ACCURATE IDENTIFICATION OF MESSAGE-BASED API CALLS IN APPLICATION BINARIES

CROSS-REFERENCE TO RELATED APPLICATIONS

This application claims the benefit of U.S. Provisional Application No. 61/914,772, filed on Dec. 11, 2013, and entitled "FAST AND ACCURATE IDENTIFICATION OF MESSAGE-BASED API CALLS IN OBJECTIVE-C BINARIES," the entirety of which is incorporated herein by reference. This application also incorporates by reference the entirety of U.S. Provisional Application No. 61/877,623, filed on Sep. 13, 2013, and entitled "SOFTWARE APPLICATION SCANNING AND REPUTATION ANALYSIS."

This application is related to U.S. patent application Ser. No. 14/498,115, filed on Sep. 26, 2014, and entitled "RISK ASSESSMENT FOR MANAGED CLIENT DEVICES," the entirety of which is incorporated herein by reference.

BACKGROUND

Static program analysis is the analysis of computer software that is performed without actually executing the software. Software application scanning through static program analysis is a proactive approach for enterprise information technology administrators to effectively manage the risks of software applications running on mobile devices of their employees. Because IT administrators usually do not have source code, only binary code, of a mobile application, static analysis of binary code becomes the choice for software application scanning in mobile application management (MAM) solutions.

A multitude of iOS applications in application marketplaces are developed with Objective-C, an object-oriented programming language. Objective-C source code of an application is compiled by a compiler (e.g., GCC or Clang) and transformed to machine code. Directly analyzing machine code is difficult, as the machine code is just a series of bits—0's and 1's. However, translating the machine code back to original Objective-C source code is also infeasible because symbol information like variable types and names are stripped off during the compilation process. A common way to translate the machine code is to use a tool to disassemble the machine code and convert it to assembly, a low-level intermediate representation between source code and machine code. A static analysis may then be performed over the assembly code.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application is generally directed to application scanning and, more particularly, to systems, methods, apparatuses, and computer program products for providing application scanning Example embodiments of such application systems, methods, apparatuses, and computer program products may be configured to scan applications, create an application analysis based on the scan, and enforce compliance rules relating to application quality. More specifically, the application scanning may involve identifying message-based application programming interface calls in Objective-C binaries using a fast and accurate approach. As discussed below, such application scanning may be performed, for example, by an apparatus embodied by or otherwise associated with a server and comprising means, such as at least one processor, at least one memory, at least one communication interface, and/or the like, for performing such scanning according to one or more algorithms.

Figure 1:
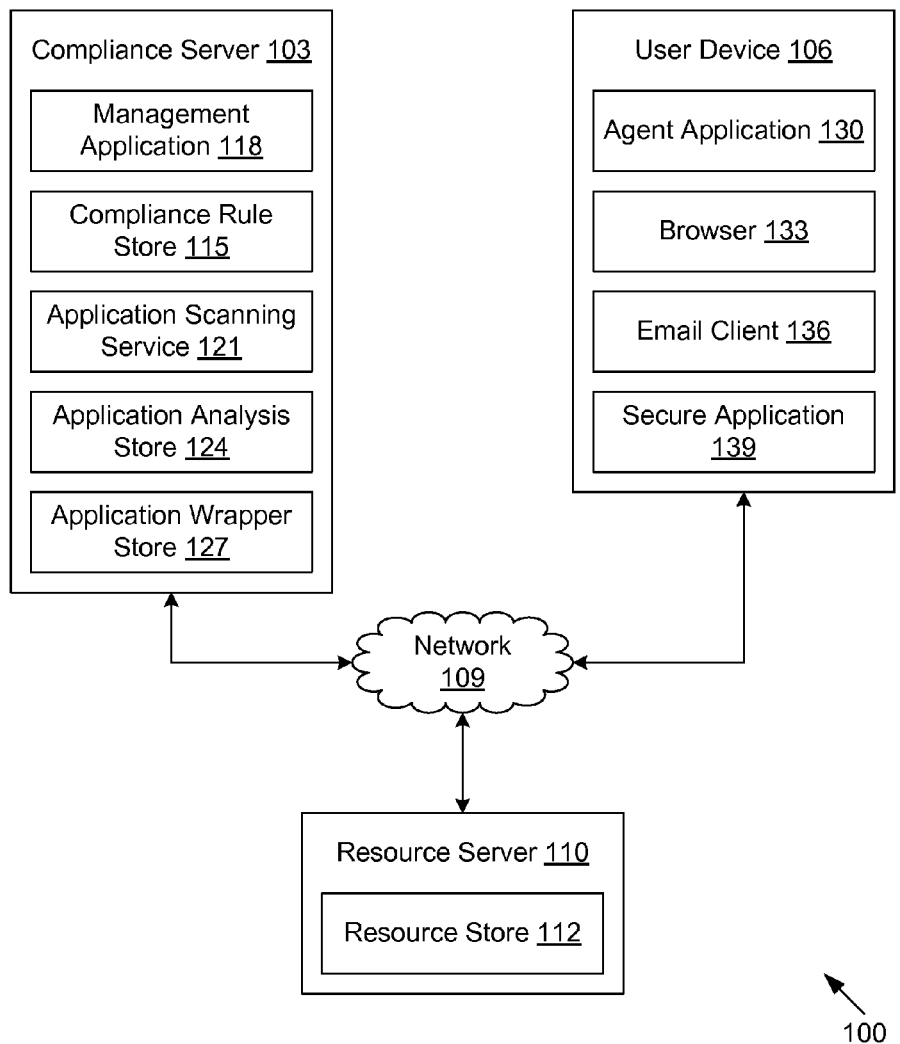
FIG. 1 illustrates a block diagram of an example application scanning system according to various embodiments of the present disclosure.

FIG. 1 illustrates a block diagram of an example application scanning system 100. While FIG. 1 illustrates one example configuration of such a system, numerous other configurations may be used according to example embodiments of the present disclosure. With reference to FIG. 1, however, the application scanning system 100 may include one or more compliance servers 103 and one or more user device(s) 106 in data communication by way of a network 109. A resource server 110 and/or other network elements may additionally be provided according to some example embodiments.

The user device(s) 106 may comprise any electronic device configured to communicate over one or more networks, such as the network 109 depicted in FIG. 1. For example, the user device(s) 106 may comprise one or more electronic devices such as a mobile telephone, smartphone, tablet computer, portable digital assistant, pager, desktop or laptop computer, a set-top box, a music player, a game console, or any of numerous other fixed or portable communication devices, computation devices, content generation devices, content consumption devices, or combinations thereof.

The resource server 110 may, for example, comprise any type of network-accessible electronic device or system that includes storage, such as the depicted resource store 112. The resource server 110 may, according to one example embodiment, comprise a public server that may be accessible to anyone who connects to it over a network, such as the network 109. According to another example embodiment, the resource server 110 may be a private server accessible only over a private network, such as the network 109, and/or may be located behind a firewall. According to another example embodiment, the resource server 110 may additionally or alternatively require user registration and/or may require use of an authorized user device 106, to access it. The resource server 110 may store any type of data, such as one or more databases, some of which will be described in further detail below.

The compliance server 103 may be any type of network-accessible electronic device or system that includes storage, such as the depicted compliance rule store 115, and may be configured to communicate with the user device(s) 106, and/or the resource server 110 over one or more networks, such as the network 109 depicted in FIG. 1, to provide device, content and/or application management capabilities. For example, the compliance server 103 may comprise cloud-based solutions, server computers and/or any other systems configured to provide device, content, and/or application management capability. The compliance server 103 may, according to some example embodiments, further be configured to direct the resource server 110 to transmit data, e.g., to one or more user devices 106, and/or to direct the one or more user device(s) 106 to transmit data, e.g., to the compliance server 103 and/or resource server 110. According to other example embodiments, the compliance server 103 may be configured to scan one or more applications, as described below.

The compliance server 103 may comprise a management application 118 and a compliance rule store 115 storing one or more compliance rules, e.g., compliance policies, that may be applicable to the user device(s) 106. While the management application 118 is shown as within the compliance server 103, the management application 118 may additionally or alternately be within the user device(s) 106, and/or remotely located on the resource server 110 and may be remotely updated, such as periodically, by the compliance server 103 according to any number of suitable over-the-air (OTA) updating methods. The compliance server 103 may additionally include an application scanning service 121, an application analysis store 124, an application wrapper store 127, and/or other applications.

Attempts by the user device(s) 106 to perform certain functionality, such as viewing, modifying, transmitting, and/or receiving various content, may require the user device 106 to be in compliance with one or more of the compliance rules. Depending on the sensitivity and/or nature of a given functionality, different compliance rules may be necessary to ensure that the functionality is adequately restricted. Some functionality may only require ensuring, e.g., by one or more authentication procedures, that the proper user is requesting the functionality. Other functionality may require compliance with more stringent authorization rules, such as determining whether the functionality is restricted during certain time windows or geographic areas. Accordingly, the user device(s) 106 and/or the compliance server 103 may be operative to determine whether the user of the user device 106 is authorized to perform requested functionality at the time the user requests to perform such functionality.

The compliance server 103 may, for example, use the compliance rules to impose hardware restrictions regarding the use of specific devices and/or specific device features, such as, for instance, cameras, BLUETOOTH, infrared, tethering, external storage, a mobile access point, and/or other hardware restrictions. The compliance rules may additionally or alternatively impose software restrictions such as the use of specific wireless device operating systems or applications, Internet browser restrictions, screen capture functionality, and/or other software restrictions. Mobile device management restrictions may additionally or alternatively be included in the compliance rules and may comprise encryption requirements, firmware versions, remote lock and wipe functionalities, logging and reporting features, global positioning system (GPS) tracking, and/or other mobile device management features.

The compliance server 103 may determine whether one or more device characteristics of a requesting device, e.g., the user device(s) 106, satisfy one or more of the restrictions enumerated in the compliance rules. For example, the compliance server 103 may determine that a requesting device that has a camera, BLUETOOTH capability, and is executing a specified version of an operating system is compliant with the compliance rules. As another example, the compliance server 103 may determine that a requesting device that is associated with an external storage unit and has screen capture functionality enabled is not compliant with the compliance rules.

In some embodiments, an agent application 130 executed on the user device(s) 106 may make the compliance determination based on a device profile, credentials, and/or user preferences. For instance, the agent application 130 may monitor calls by applications, such as a browser 133, an email client 136, a secure application 139, and/or any other application, on the user device 106 to an operating system of the user device 106 to determine whether the user device 106 seeks to perform functionality associated with one and/or more of the compliance rules described above. Additionally, the agent application 130 executed on the user device(s) 106 may approve and/or deny the associated functionality requests. For instance, the agent application 130 may instruct the operating system on the user device(s) 106 to prevent the device from performing certain functionality in response to a determination that a compliance rule specifies that such functionality is not authorized.

In some embodiments, the agent application 130 executed on the user device(s) 106 may rely on the compliance server 103 to determine whether a given functionality of the device is authorized according to the compliance rules. For instance, the agent application 130 may transmit information, such as a device profile, access credentials, authentication information, information regarding one or more authentication attempts, and/or information regarding one or more individuals to the compliance server 103 so that compliance server 103 may determine whether the user device 106 seeks to perform functionality that may violate a given compliance rule. Additionally, the compliance server 103 may approve and/or deny the associated functionality requests.

In some embodiments, the compliance rules may comprise device settings and/or executable instructions that define which functionality the operating system of the user device(s) 106 is authorized to perform. Furthermore, the compliance rules may comprise a list of functions, such as those provided by application programming interfaces (APIs) associated with the operating system and/or a platform library that may be treated as protected functions. Viewing, modifying, receiving, and/or transmitting content may, for example, comprise or otherwise be associated with one or more of these functions. Calls to these functions, such as calls to retrieve login credentials, or attempts to interact with (e.g., view, modify, transmit or receive) content, may result in checks by the user device 106, e.g., by the agent application 130, and/or the compliance server 103, e.g., by the management application 118, for compliance with the compliance rules. According to some example embodiments, compliance rules may comprise application characteristics, such as application reputation and/or quality, such as may be determined by scanning an application as described herein. Such application scanning may, for example, be performed by the application scanning service 121. The application scanning service 121 may, for example, be embodied as program code embodied in one or more memories and executed by one or more processors, and which may be embodied by or otherwise associated with the compliance server 103. Resultant analysis from the application scanning may be stored for later reference, e.g., when enforcing compliance rules, in the application analysis store 124.

In some embodiments, the agent application 130 may perform a set of ordered operations to accomplish a requested function. These operation sets may be defined on, e.g., stored in a memory of, the user device(s) 106 and/or the compliance server 103 and may comprise one or more operations to determine whether the user device 106 is in compliance with compliance rules from the compliance rule store 115. The agent application 130 may control at least one respective computing resource of the user device(s) 106. The operations may include configuring at least one respective computing resource of the user device(s) 106 such as restricting access to at least one resource managed by the agent application 130.

For purposes of convenience, the resource server 110 and compliance server 103 are each referred to herein in the singular, although it will be understood that a plurality of one or both servers may be employed in the arrangements as described herein. For example, in some embodiments, multiple compliance servers 103 and/or resource servers 110 may operate on the same server computing device. The components executed on the compliance server 103 and/or the resource server 110, may, for example, comprise various applications, services, processes, systems, engines, or functionality not disclosed in detail herein.

As shown in FIG. 1, the user device(s) 106, the compliance server 103, and/or resource server 110 may communicate with one another directly and/or through the network 109. The user device(s) 106, the compliance server 103, and/or the resource server 110 may connect to the network 109 through wired or wireless means, such as through one or more intermediate networks. For example, the user device(s) 106, compliance server 103, and/or resource server 110 may connect with the network 109 through wired means such as Ethernet, USB (Universal Serial Bus), or the like, or through wireless means such as, for example, WI-FI, BLUETOOTH, or the like, or by connecting with a wireless cellular network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network.

Accordingly, the network 109 may comprise, for example, one or more wired and/or wireless networks such as one or more wireless local area networks (WLAN), wireless wide area networks (WWAN), Ethernet networks, fiber-optic networks, and/or any other type of wired and/or wireless network. Additionally, the network 109 may comprise the Internet and/or one or more intranets, extranets, microwave networks, satellite communications networks, cellular networks, infrared communication networks, global area networks, or other suitable networks, etc., or any combination of such networks.

Figure 2:
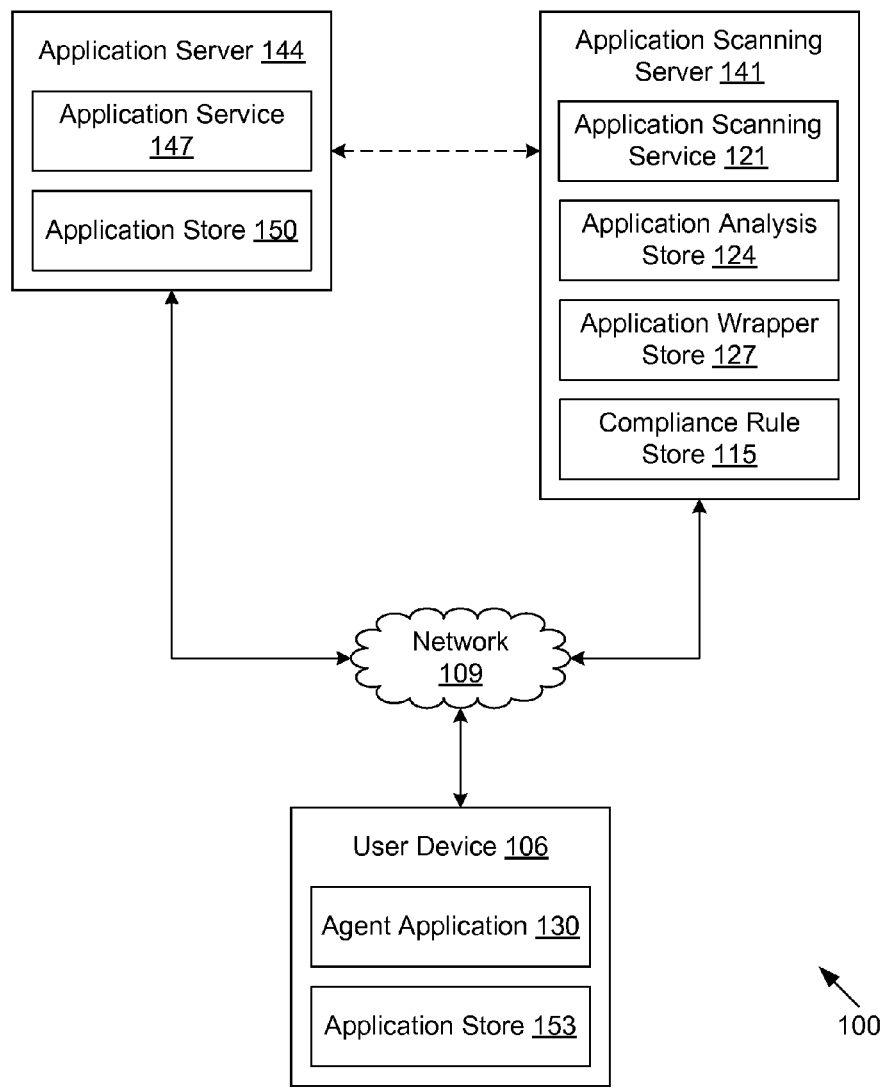
FIG. 2 depicts an alternative configuration of an application scanning system according to various embodiments of the present disclosure.

FIG. 2 depicts an alternative configuration of an application scanning system 100. As shown, the system 100 may comprise an application scanning server 141, which may include an application scanning service 121, an application analysis store 124, an application wrapper store 127, and a compliance rule store 115. The system 100 may also comprise an application server 144, upon which an application service 147 may be executed to serve up applications to user devices 106. The application server 144 may also include an application store 150 that stores one or more applications. Applications may be transferred from the application server 144 to the user device 106 through the network 109 and then stored in an application store 153 on the user device 106.

As discussed above, the application scanning service 121 may scan one or more applications as described herein and may, for example, be embodied as program code embodied in one or more memories and executed by one or more processors, which may be embodied by or otherwise associated with the application scanning server 141. Resultant analysis from the application scanning may be stored for later reference, e.g., when enforcing compliance rules, in the application analysis store 124. It will be understood that one or more components of FIGS. 1 and 2 may exist in a single system. For example, some embodiments may employ one or more of a compliance server 103 (FIG. 1), an application scanning server 141, and/or an application server 144 in conjunction.

Figure 3:
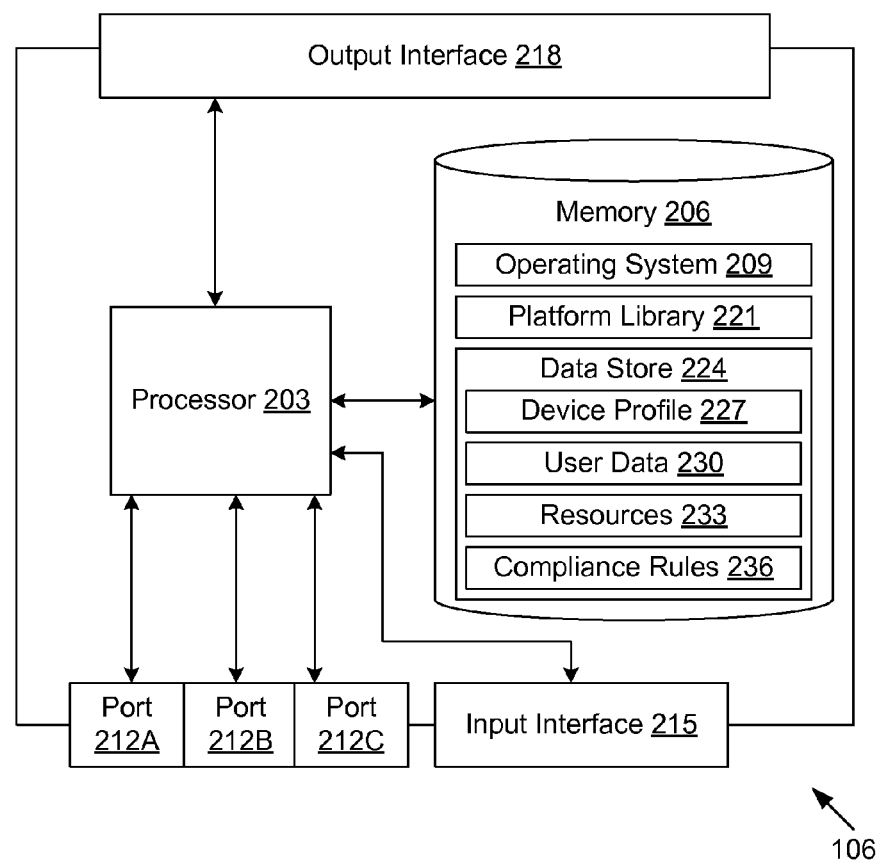
FIG. 3 depicts a diagram of an example user device of FIG. 1 or 2 according to various embodiments of the present disclosure.

Turning now to FIG. 3, a diagram of an example user device 106 is depicted. While FIG. 3 illustrates one example configuration of such a user device 106, numerous other configurations may be used according to other embodiments. With reference to FIG. 3, however, the user device 106 may comprise a processor 203, e.g., at least one processor, co-processor, and/or processing circuitry, and at least one memory 206. Depending on the configuration and type of device, the memory 206 may comprise, but is not limited to, volatile (e.g., random access memory (RAM)), non-volatile (e.g., read-only memory (ROM)), flash memory, or any combination thereof. The memory 206 may store executable programs, e.g., program code instructions, and related data components of various applications and modules for execution by the processor 203. The at least one memory 206 may be communicatively connected to the at least one processor 203, e.g., by one or more system buses for transferring data.

Basic functionality of the user device 106 may be provided by an operating system 209 contained in the at least one memory 206 and executed by the at least one processor 203. One or more programmed software applications may be executed by utilizing the computing resources in user device 106. For example, applications stored in the memory 206 may be executed by the processor 203 under the auspices of operating system 209. For example, processor 203 may be configured to execute applications such as web browsing applications, email applications, instant messaging applications, social networking applications, applications configured to view and/or manipulate content, and/or other applications capable of receiving and/or providing data.

Data provided as input to and/or generated as output from the application(s) may be stored in the memory 206 and read by the processor 203 from the memory 206 as needed during the course of application program execution. Input data may be data stored in the memory 206 by a secondary application or other source, either internal or external to user device 106, or provided during installation of the application.

The user device 106 may include one or more communication ports, such as the communication ports 212(A)-(C) depicted in FIG. 3. It will be understood that although three communication ports are depicted in the example user device 106 depicted in FIG. 3, any number of such ports may be present according to other example configurations of a user device 106. Such communication ports 212(A)-(C) may allow the user device 106 to communicate with other devices, such as other user devices 106, the compliance server 103 (FIG. 1), and/or the resource server 110 (FIG. 1), and may comprise components such as a wireless network connectivity interface, an Ethernet network adapter, and/or a modem.

For example, the wireless network connectivity interface may comprise one and/or more of a wireless radio transceiver, PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, and/or the like. According to some embodiments, the communication ports 212(A)-(C) may additionally or alternatively include one or more antennas, supporting hardware and/or software, and/or supporting circuitry configured to receive and/or transmit signals according to any short-range communication protocols and/or standards, such as, for example, near field communication (NFC), BLUETOOTH, and/or BLUETOOTH Low Energy (BLE). According to some embodiments, the communication ports 212(A)-(C) may additionally or alternatively include one or more interfaces configured to provide location services, such as one or more antennas, supporting hardware and/or software, and/or supporting circuitry configured to receive signals transmitted from GPS satellites.

The user device 106 may also receive data as user input through an input interface 215, such as one or more of a keyboard, a mouse, a pen, a stylus, a sound input device, a touch input device, a biometric device, a capture device, a brain-computer interface (BCI), etc. The input interface 215 may additionally or alternatively comprise one or more sensing devices, such as one or more cameras, microphones, motion detectors, proximity sensors, biometric sensors and/or the like, which may be configured to capture visual, aural, physical, and/or other types of stimuli and/or information, such as spoken words, motions, gestures, biometric signatures and/or the like.

Data generated by applications may be caused to be stored in the memory 206 by the processor 203 during the course of application program execution. Data may be provided to the user of the user device 106 during application program execution by means of an output interface 218. The output interface 218 may comprise one or more devices configured to provide information and/or stimuli to a user, such as one or more display devices; speakers; force, vibration, and/or haptic feedback generating devices; implanted and/or physiologically-integrated output devices; heads-up display devices, and/or the like. It will be understood that although the input and output interfaces 215, 218 are depicted as distinct components in FIG. 3, they may, according to example embodiments, be embodied by one or more components comprising both input and output functionality. For example, the input and output interface 215, 218 may comprise a touchscreen device, e.g., a display device configured to both display information and receive user input, such as through a touch detection interface.

The at least one memory 206 may also comprise a platform library 221. The platform library 221 may comprise one or more collections of functionality, e.g., utilities, useful to multiple applications, such as may be provided by an application programming interface (API) to a software development kit (SDK). These utilities may be accessed by applications as necessary so that each application does not have to contain these utilities, thus allowing for memory consumption savings and a consistent user experience. The platform library 221 may also provide functionality associated with application wrapping, defined herein as adding additional functionality (referred herein as "wrapper-provided functionality") to applications without affecting (or, in some cases, only minimally affecting) the application's preexisting, or "stock" functionality. For example, an existing game application may be wrapped to provide support for compliance rules such as those that prohibit the application from executing during work hours; the game's functionality would be unaffected during non-work hours. Similarly, an existing application may be wrapped to require user authentication before the application may be accessed. Some example embodiments may provide security breach remediation functionality to applications by wrapping.

Furthermore, embodiments of this disclosure may be practiced in conjunction with a graphics library, other operating systems, or any other application program and is not limited to any particular application or system. The devices described with respect to the Figures may have additional features or functionality. For example, user device 106 may also include additional data storage devices (removable and/or non-removable) such as, for example, magnetic disks, optical disks, or tape (not shown).

The user device 106 may store in the memory 206, e.g., in a data store 224, a device profile 227, user data 230, resources 233, and compliance rules 236. The device profile 227 may, for example, comprise information such as an indication of a current position of user device 106 and/or indications of various hardware, software, and/or security attributes pertaining to the user device 106. For instance, the device profile 227 may represent hardware specifications of the user device 106, version and/or configuration information of various software program and/or hardware components installed on user device 106, data transmission protocols enabled on user device 106, version and usage information of the various resources 233 stored on user device 106, and/or any other attributes associated with the state of user device 106. The device profile 227 may additionally or alternatively comprise operational status information, such as information regarding any errors or faults detected in the user device 106; information regarding device temperature; information regarding resource levels such as battery levels, free storage space, and/or signal strengths; and/or the like. The device profile 227 may additionally or alternatively comprise data indicating a date of last virus scan of the user device 106, a date of last access of the user device 106 by an IT representative, a date of last service of the user device 106 by an IT representative, and/or any other data indicating maintenance and/or usage of the user device 106. The device profile 227 may additionally or alternatively comprise indications of past behavior of associated users, such as resources accessed, charges for resource accesses, and/or inventory accessed from such resources.

The user data 230 may comprise information regarding one or more users of the user device 106. For example, the user data 230 may comprise one or more user preferences, e.g., one or more parameters that may affect the experience of the user. Additionally or alternatively, the user data 230 may include indications of a device user's age, gender, bodily traits, preferred resource types, preferred venue resources, and/or any other type of information relating to a user or combinations of such information. Additionally or alternatively, the user data 230 may include indications of one or more access levels, roles, policy groups, or the like of a device user, e.g., for use in providing varying levels of functionality and/or access (e.g., to protected content), for different users of a given user device 106.

The user device 106 may also store at least one resource 233 in the data store 224. The resources 233 may, for example, include any data or content, such as databases, applications, audio/video content, electronic records, applications and/or application files, and/or the like. More specifically, resources 233 may include at least one of the following file types: data files, audio files, video files, three-dimensional image files, raster image files, vector image files, page layout files, text files, word processor files, spreadsheet files, presentation files, graphic files, audio files, photographic files, video files, database files, executable files, CAD files, web files, plug-in files, font files, system files, settings files, encoded files, compressed files, disk image files, developer files, backup files, and/or any other files.

Figure 4:
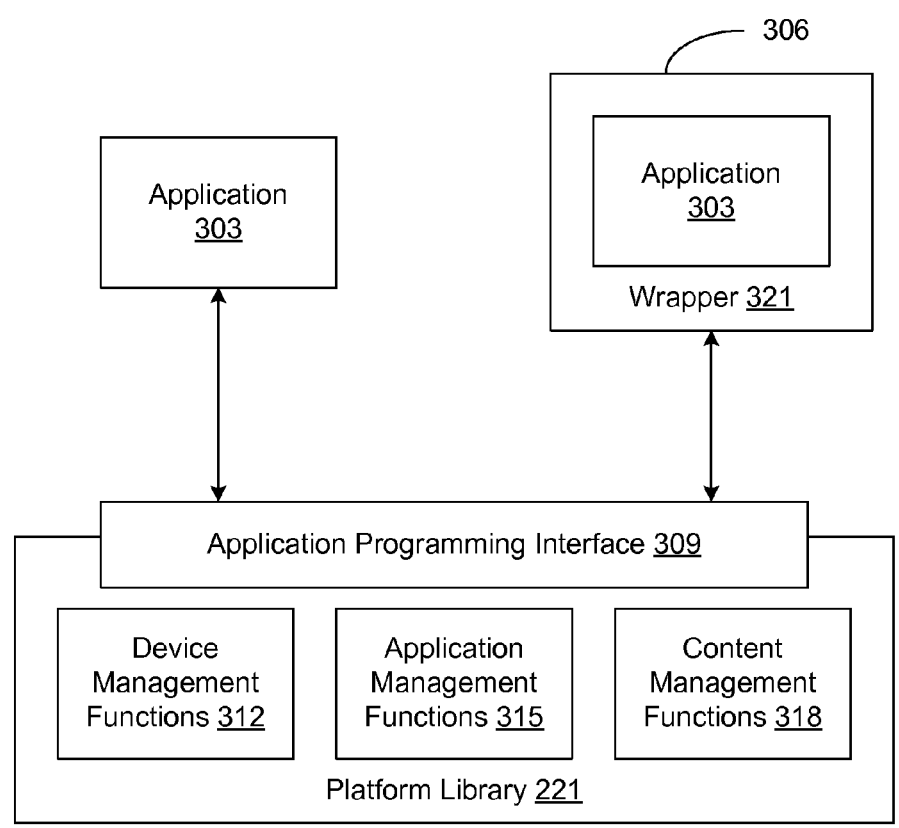
FIG. 4 is a block diagram illustrating greater detail regarding the platform library of FIG. 3 according to various embodiments of the present disclosure.

FIG. 4 is a block diagram illustrating greater detail regarding the platform library 221. An application 303 and/or a wrapped application 306 may communicate with platform library 221 through a plurality of function calls comprising an application programming interface (API) 309. In some embodiments, the application 303 and the wrapped application 306 may utilize the same function calls. In some embodiments, the application 303 and the wrapped application 306 may utilize different function calls despite being associated with the same and/or similar functionality. The function calls may allow the applications to access various features and functionality provided by the platform library 221, such as a set of device management functions 312, a set of application management functions 315, and/or a set of content management functions 318.

Wrapped application 306 may comprise a binary executable file whose functionality has been modified by the addition of an application wrapper 321. The application wrapper 321 may, for example, comprise a program or application that encapsulates the application 303, serving as an intermediary between the application 303 and the operating system 209 and/or the platform library 221. In this way, the application wrapper 321 may modify, e.g., add to, restrict, enhance, etc., any of the "stock" functionality provided by the application 303. For example, if the application 303 is configured to be accessible without requesting user authentication, the wrapper 321 may add to the functionality of the application 303 by requiring authentication before a user can access the application 303. Similarly, if application 303 is configured to communicate over an unsecured (e.g., unencrypted) connection with a given public server, the wrapper 321 may modify this functionality by forcing the communication to take place over a secured connection or even by preventing the communication altogether. The modifications provided by the wrapper 321 may, for example, comprise precompiled functions that may call out to an API, such as the API 309.

Thus, application wrapping may allow additional, "wrapper-provided" functionality to be added to an existing application, such as the application 303. In some embodiments, application wrapping may be accomplished dynamically upon installation and/or execution of an application 303 without requiring recompilation of the source code of the application 303. Application wrapping may thus comprise a preferred and/or more convenient means of modifying an application 303 and may, according to some embodiments, even be used in instances in which source code for the application 303 is unavailable.

In some embodiments, compliance rules 236 (FIG. 3) such as those provided by the compliance server 103 (FIG. 1) may control which functions of the API 330 are enabled and/or used in the application 303 and wrapped application 306. For example, users in a sales group may be permitted by the compliance server 103 to download an enterprise's expense submitting application 303 without modification, while users in an accounting group may receive a modified version of the same application 303. The modified version may rely on functionality provided by the platform library 221 to enhance the security of the application 303, such as by adding a call to an encryption function for communications from the application that are intended for transmission over the network 109 (FIG. 1).

Various functions may be provided by the platform library 221, including authentication, authorization, and determination functions. The device management functions 312 may comprise, for example, functions operative to determine whether user device 106 has been compromised, e.g., "rooted," "jailbroken," or the like, and/or to identify a location of the user device 106 by invoking and/or accessing one or more location services of the user device 106, such as a GPS service and/or a signal (e.g., cellular or WI-FI) triangulation-based service. The application management functions 315 may comprise, for example, functions operative to encrypt data and/or communications used by the application 303 and the wrapped application 306, to distribute configuration information, to provide authorization and/or credentials, and/or to provide logging and reporting functionality. The content management functions 318 may comprise, for example, functions to update shared content data used by application 303 and wrapped application 306 and/or to provide branding functionality to alter the appearance of application 303 and wrapped application 306.

Other management functionality may comprise enforcing compliance rules 236 and/or restrictions distributed by compliance server 103, which may be accomplished at the device, application, and/or content level. Such compliance rules may comprise time, date and/or location based restrictions on accessing the user device 106, the application 303, the wrapped application 306, local assets, and/or remote assets.

Figure 5:
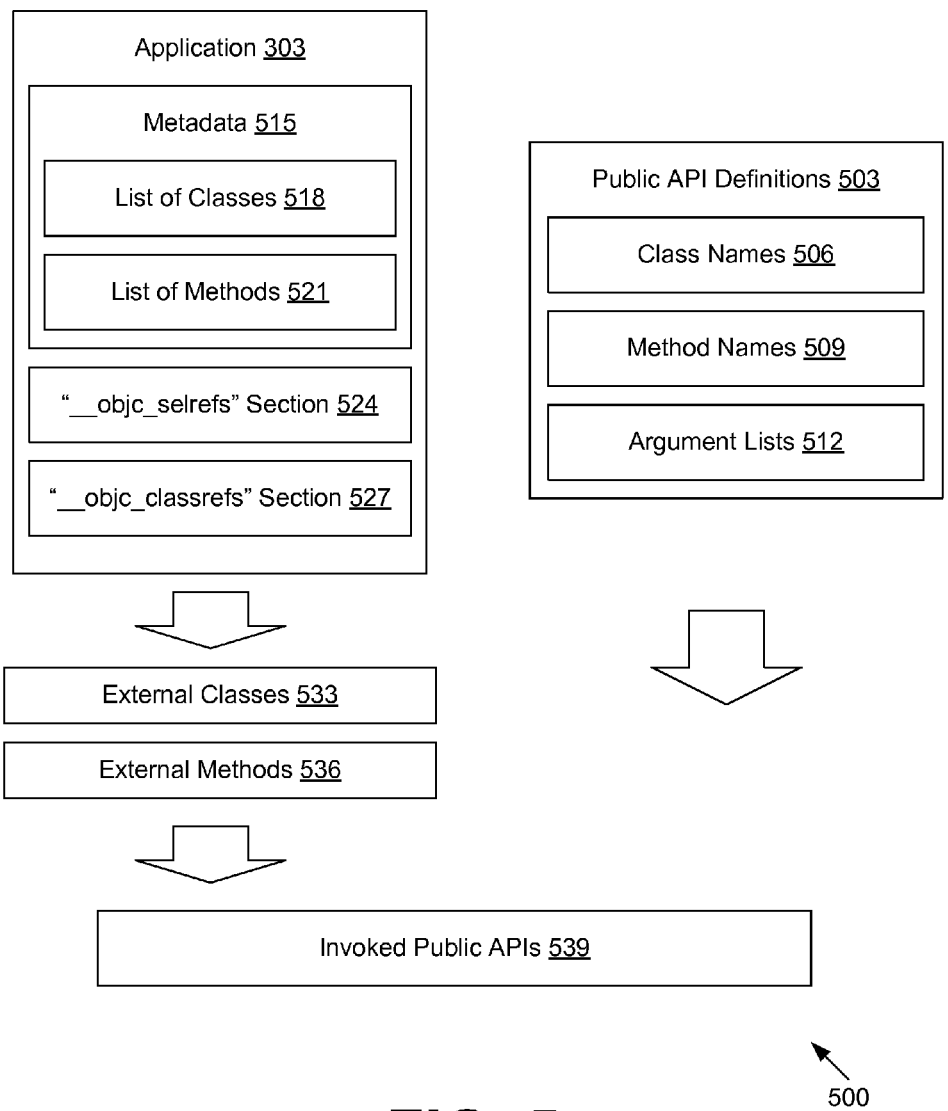
FIG. 5 is an example data flow diagram for an application scanning procedure according to various embodiments of the present disclosure.

Moving on to FIG. 5, shown is an example data flow diagram 500 for an application scanning procedure according to various embodiments of the present disclosure. An iOS application 303 typically interacts with external entities, such as the operating system 209 (FIG. 3) and the network 109 (FIG. 1), through invoking the application programming interfaces 309 (FIG. 4) in iOS platform libraries 221 (FIG. 4), which may also be termed "frameworks." One task used in static program analysis by an application scanning service 121 (FIGS. 1 & 2) is to extract the system library API calls in a target application 303.

Objective-C implements the API calls based on a message passing approach. When calling an API 309, a message is sent to a receiver object that then uses the dynamic dispatch routine "objc_msgSend" to handle the message at runtime. The routine "objc_msgSend" is a message-passing function and may be considered as a proxy function. The message normally is composed of three parts: the pointer to the called object, the target method name (called a "selector" in Objective-C), and an argument list. To resolve the message, the "objc_msgSend" method is configured to locate the target method address of the called object, and to invoke the method with the argument list in the message. Note this message resolving process occurs while application is actually running, and before that, the API call in the Objective-C binary is present in the form of an "objc_msgSend" invocation with the message as an argument. For example, calling method "sel" in object "obj" with argument "arg" looks as below in Objective-C source code:

[obj sel: arg]

This can be translated to the following instructions in assembly (ARM assembly):

MOV R2, arg
MOV R1, sel
MOV R0, obj
BLX objc_msgSend

In this non-limiting example, "obj," "sel," and "arg" are passed to "objc_msgSend" method as arguments. According to ARM's calling convention, registers R0-R3 of the processor 203 (FIG. 3) are used to hold the first three arguments passed to a function call. Consequently, identifying message-based system library API calls in Objective-C binary involves extracting and recognizing the arguments of "objc_msg-Send" calls, which is not a trivial task.

One approach may be to traverse the text section of the Objective-C binary and identify all of the call sites of "objc_msgSend" function. Then, for each call site, backward slicing may be performed over the register R0 (class name) and R1 (selector name) respectively. This is used to locate all instructions that influence or define the values in the target register. The searching is stopped when either the start of the function is reached or the values of target operands can be statically determined, e.g., either a constant or a static address.

If a static address is encountered, the corresponding symbol is resolved by looking up the "_objc_classrefs" or "_objc_selrefs" sections in the Objective-C binary. Dissemblers (e.g., IDA-Pro) may create cross-references for these static addresses, if possible. Accordingly, with these cross-references, the corresponding symbols (class name or function name) are directly available and no discovery operation is needed. The constants and symbols of those operands are forward propagated along the slice according to the semantics of the instructions. The propagation stops when the call site of "objc_msgSend" function is reached. If the target register (either R0 or R1) is hit, then its value is determined; otherwise, its value is unknown. When all the "objc_msgSend" functions are resolved, the public APIs being invoked in the binary may then be reported.

See, e.g., M. Egele, C. Kruegel, E. Kirda, and G. Vigna, "PiOS: Detecting Privacy Leaks in iOS Applications," in Proceedings of the Network and Distributed System Security Symposium (NDSS), San Diego, Calif., February 2011; J. Han, Q, Yan, D. Gao, J. Zhou and R. Deng, "Comparing Mobile Privacy Protection through Cross-Platform Applications," in Proceedings of the Network and Distributed System Security Symposium (NDSS), San Diego, Calif., February 2013; and T. Werthmann, R. Hund, L. Davi, A. Sadeghi and T. Holz, "PSiOS: Bring Your Own Privacy & Security to iOS Devices," in 8th ACM Symposium on Information, Computer and Communications Security (ASIACCS 2013), May 2013; all of which are herein incorporated by reference.

Such an approach is inefficient because it does not differentiate the calls of local functions from those in platform libraries 221 during the message-resolving phase, while resolving only the public API calls may be of importance for application scanning. As a result, all the computing efforts spent on resolving the local function calls are wasted. Further, given the static analysis nature, it may be likely to miss capturing a target register in many cases, for example: used object, object passed to function as an argument, object defined in an array, and so on, which is especially true for R0 (class name). Consequently, false negatives may result.

Approaches to application scanning that involve identifying public API calls in particular will next be discussed with reference to the entities depicted in FIG. 5. Various public API definitions 503 may be obtained as an initial matter. These public API definitions 503 may include class names 506, method names 509, argument lists 512, and/or other data. For APPLE-based platforms, these public API definitions may be extracted from the header files of the public platform libraries 221 that are available in Xcode. This may be a one-time operation, and the output list can be applied to analysis of any Objective-C binary. In some cases, the public API definitions 503 may be updated and refreshed.

Next, the metadata 515 may be extracted from a target binary of an application 303. The metadata 515 may include a list of classes 518 and a list of methods 521 which are local to the application 303 (in other words, implemented in the application 303), among other data. The list of classes 518 may specify the names of the classes. The list of methods 521 may specify the method names and starting addresses for the methods of each class. The "_objc_selrefs" section 524 and the "_objc_classrefs" section 527 of the application 303 may be provided by a disassembler or another tool that performs a similar analysis.

The "_objc_classrefs" section 527 may be traversed to obtain all of the classes, both local and external, used in the application 303. This list may then be compared with the list of classes 518 to obtain all of the external classes 533 in the application 303. Next, the "_objc_selrefs" section 524 may be traversed to obtain all of the methods, both local and external, used in the application 303. This list may then be compared with the list of methods 521 to obtain all of the external methods 536 in the application 303. The external classes 533 and the external methods 536 are then compared with the public API definitions 503 to produce a list of invoked public APIs 539.

Based upon this list of invoked public APIs 539, further analysis may be performed on the binary for the application 303. In particular, instructions are located that refer to the method names of the invoked public APIs 539 in the "_objc_selrefs" section 524. For each such instruction, forward constant propagation may be performed along the control flow graph of the function, starting from the operand that has the static address and cross-reference to the method name. If a call site of the "objc_msgSend" function is hit and the current operand is R1, the corresponding public API may be reported with this instruction address, namely, where this public API is called. The constant propagation stops either at the last instruction of the current function, or the current operand that contains the constant is overwritten by another variable.

Optionally, if an argument of a public API that is found needs to be checked, backward slicing and forward constant propagation may be performed over the corresponding register starting from the call site of the public API.

It is noted that the approach outlined above does not involve resolving all "objc_msgSend" calls but instead focuses on the method name instead of the class name for each target public API. Accordingly, this approach is faster and more accurate than other approaches. Indeed, experimental results confirm that this approach is about three to ten times faster than other approaches and can also find more public API calls for real-world iOS applications 303.

Various non-limiting examples of public API calls that may be searched for by the application scanning service 121 will next be described. In the calendar category, the application scanning service 121 may search for method calls relating to event searches, event saving, event removing, reminder searches, calendaring items, saving reminders, removing reminders, committing, and so on. In the location category, the application scanning service 121 may search for method calls relating to updating location, monitoring significant location changes, determining whether locations have been updated, monitoring for a region, entering a region, exiting a region, and so on. In the contacts category, the application scanning service 121 may search for method calls relating to a people picker navigation controller and its delegate and others.

In the network category, the application scanning service 121 may search for method calls relating to web view load requests, network resource connections, and others. In the phone category, the application scanning service 121 may search for method calls relating to calling a phone number, obtaining a carrier name, and so on. In the text messaging category, the application scanning service 121 may search for method calls relating to a compose view controller and its delegate, and others.

In the camera category, the application scanning service 121 may search for method calls relating to an image picker controller, writing images and videos to a photo album, a view controller, and others. In the files category, the application scanning service 121 may search for method calls relating to writing to a uniform resource locator (URL), writing to a file, initializing with contents of a URL or file, and others. In the ownership category, the application scanning service 121 may search for method calls relating to user defaults with a parameter of a phone number, and others. In the audio category, the application scanning service 121 may search for method calls relating to recording audio, and others.

In various embodiments, the application scanning performed by the application scanning service 121 described herein may be configured to search for bad coding practices, out-of-date API calls, calls that load other code dynamically, reflection-related code that can expose internal operating system data, and/or other types of code that can be considered problematic.

Figure 6:
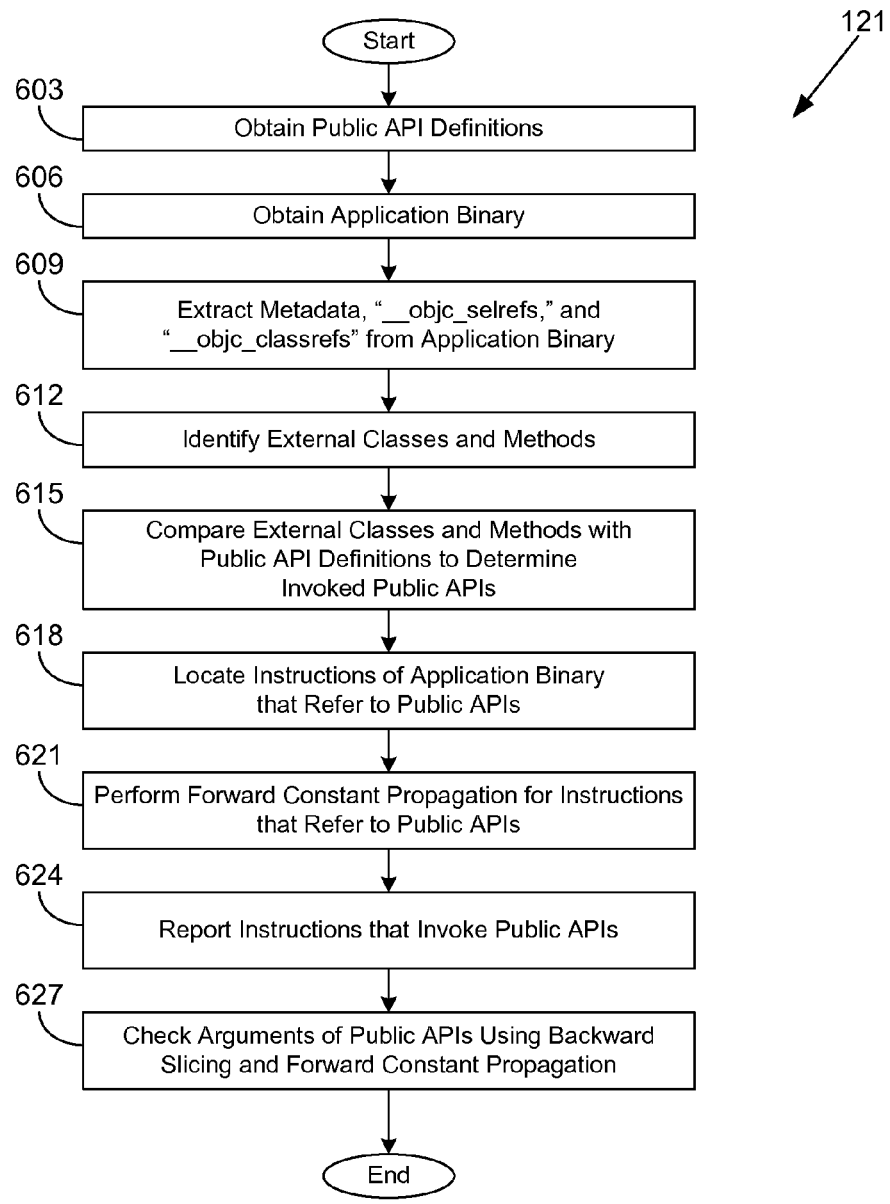
FIGS. 6 and 7 are flowcharts that provide examples of the operation of portions of the application scanning service of FIG. 1 or 2 according to various embodiments.

Referring next to FIG. 6, shown is a flowchart that provides one example of the operation of a portion of the application scanning service 121 according to various embodiments. It is understood that the flowchart of FIG. 6 provides merely an example of the many different types of functional arrangements that may be employed to implement the operation of the portion of the application scanning service 121 as described herein. As an alternative, the flowchart of FIG. 6 may be viewed as depicting an example of elements of a method implemented in a compliance server 103 (FIG. 1) an application scanning server 141 (FIG. 2), or a user device 106 (FIG. 1), according to one or more embodiments.

Beginning with box 603, the application scanning service 121 obtains the public API definitions 503 (FIG. 5). In box 606, the application scanning service 121 obtains a binary application 303 (FIG. 5). In box 609, the application scanning service 121 extracts the metadata 515 (FIG. 5) (including a list of classes 518 (FIG. 5) and a list of methods 521 (FIG. 5)), the "_objc_selrefs" section 524 (FIG. 5), and the "_objc_classrefs" section 527 (FIG. 5) from the application 303.

In box 612, the application scanning service 121 identifies external classes 533 (FIG. 5) and external methods 536 (FIG. 5) by comparing the classes in the list of classes 518 with the classes in the "_objc_classrefs" section 527 and by comparing the methods in the list of methods 521 with the methods in the "_objc_selrefs" section 524. In box 615, the application scanning service 121 compares the external classes 533 and the external methods 536 with the public API definitions 503 to determine the invoked public APIs 539 (FIG. 5).

In box 618, the application scanning service 121 locates instructions of the application 303 that refer to the public APIs. In box 621, the application scanning service 121 performs forward constant propagation for instructions that refer to public APIs. In box 624, the application scanning service 121 reports instructions that invoke public APIs. In box 627, the application scanning service 121 may check arguments of one or more invocations of public APIs using backward slicing and forward constant propagation. Thereafter, the portion of the application scanning service 121 ends.

Figure 7:
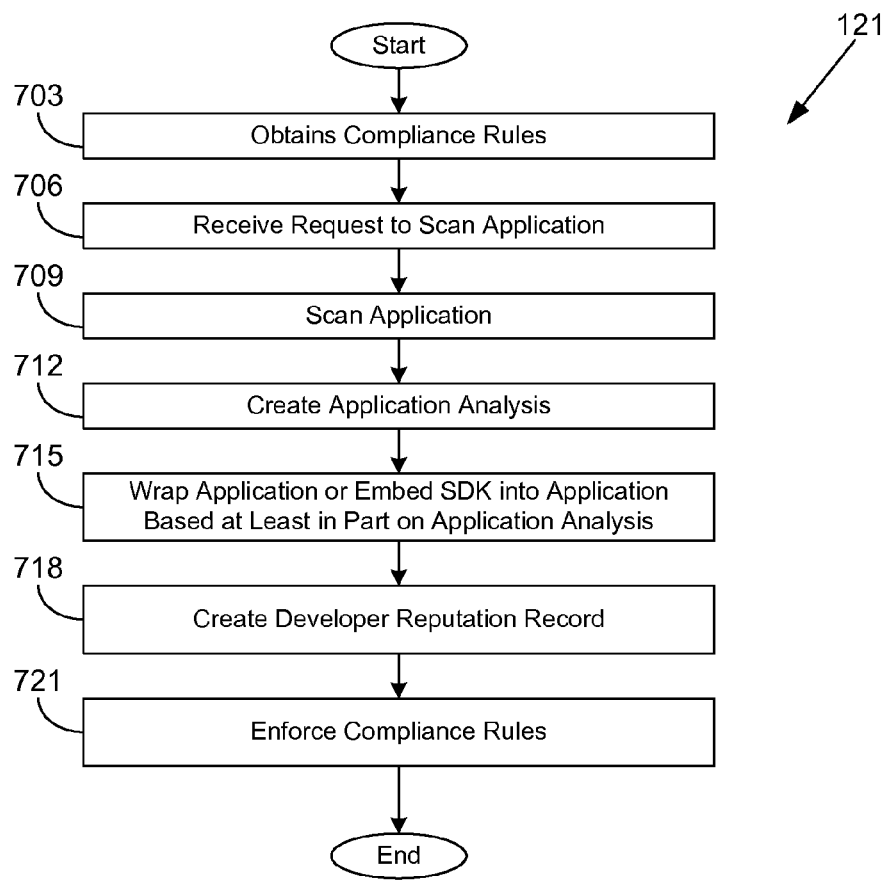

Continuing to FIG. 7, shown is a flowchart that provides one example of the operation of another portion of the application scanning service 121 according to various embodiments. It is understood that the flowchart of FIG. 7 provides merely an example of the many different types of functional arrangements that may be employed to implement the operation of the other portion of the application scanning service 121 as described herein. As an alternative, the flowchart of FIG. 7 may be viewed as depicting an example of elements of a method implemented in a compliance server 103 (FIG. 1), an application scanning server 141 (FIG. 2), or a user device 106 (FIG. 1), according to one or more embodiments.

Beginning with box 703, the application scanning service 121 obtains compliance rules 236 (FIG. 3) from a compliance rule store 115 (FIGS. 1 & 2). In box 706, the application scanning service 121 receives a request to scan an application 303 (FIG. 4). In box 709, the application scanning service 121 scans the application 303, including performing the process depicted in the flowchart of FIG. 6. In box 712, the application scanning service 121 creates an application analysis in the application analysis store 124 (FIGS. 1 & 2) based at least in part on the application scan.

In box 715, the application scanning service 121 may wrap the application 303, embed a software development kit (SDK) into the application 303, or perform another action based at least in part on the application analysis. In box 718, the application scanning service 121 may create a developer reputation record based at least in part on the application analysis. In box 721, the application scanning service 121 enforces the compliance rules 236 based at least in part on the software analysis and/or the developer reputation record. Thereafter, the portion of the application scanning service 121 ends.

The flowcharts of FIGS. 6 and 7 show the functionality and operation of an implementation of portions of the application scanning service 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 203 (FIG. 3) in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Further, any logic or application described herein, including the application scanning service 121, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Although the embodiments described herein are discussed in terms of examples relating to iOS and Objective-C, it is understood that the principles of the present disclosure may apply to other operating systems and programming languages.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:
   code that analyzes binary code of an application to determine a first listing of classes and a first listing of methods, wherein the first listing of classes includes local but not external classes used in the application, and the first listing of methods includes local but not external methods used in the application;
   code that analyzes metadata of the application to determine a second listing of classes and a second listing of methods, wherein the second listing of classes includes both local and external classes used in the application, and the second listing of methods includes both local and external methods used in the application;
   code that determines a listing of external classes from the first listing of classes and the second listing of classes;
   code that determines a listing of external methods from the first listing of methods and the second listing of methods;
   code that identifies a plurality of public application programming interface (API) definitions from a plurality of header files; and
   code that determines a plurality of public APIs invoked by the application by comparing the listing of external classes and the listing of external methods with the plurality of public API definitions.

2. The non-transitory computer-readable medium of claim 1, further comprising code that determines a plurality of instructions of the application that invoke respective ones of the plurality of public APIs by way of a proxy function using forward constant propagation, wherein the code that determines the plurality of instructions is configured to refrain from performing forward constant propagation in relation to non-public APIs.

3. The non-transitory computer-readable medium of claim 2, further comprising code that determines an argument of a particular one of the plurality of instructions using backward slicing and forward constant propagation.

4. A system, comprising:
   at least one computing device; and
   an application scanning service executed in the at least one computing device, the application scanning service, when executed, causing the at least one computing device to at least:
      analyze binary code of an application to determine a first listing of classes and a first listing of methods, wherein the first listing of classes includes local classes but not external classes, and the first listing of methods includes local methods but not external methods;
      analyze metadata of the application to determine a second listing of classes and a second listing of methods, wherein the second listing of classes includes at least one local class and at least one external class, and the second listing of methods includes at least one local method and at least one external method;
      determine a listing of external classes from the first listing of classes and the second listing of classes;
      determine a listing of external methods from the first listing of methods and the second listing of methods;
      obtain data identifying a plurality of public application programming interface (API) definitions; and
      determine a plurality of public APIs invoked by the application by comparing the listing of external classes and the listing of external methods with the data identifying the plurality of public API definitions.

5. The system of claim 4, wherein the application scanning service, when executed, further causes the at least one computing device to at least evaluate the application for compliance with at least one compliance rule based at least in part on the plurality of public APIs invoked by the application.

6. The system of claim 4, wherein the application scanning service is configured to refrain from performing forward constant propagation in relation to non-public APIs.

7. The system of claim 4, wherein the application scanning service, when executed, further causes the at least one computing device to at least determine a plurality of instructions of the binary version of the application that invoke respective ones of the plurality of public APIs by way of a proxy function.

8. The system of claim 7, wherein the application scanning service employs forward constant propagation to determine the plurality of instructions.

9. The system of claim 8, wherein the application scanning service, when executed, further causes the at least one computing device to at least stop the forward constant propagation in response to determining that a current operand containing a particular constant is overwritten by another variable.

10. The system of claim 8, wherein the application scanning service, when executed, further causes the at least one computing device to at least stop the forward constant propagation in response to reaching a last instruction of a current function.

11. The system of claim 7, wherein the application scanning service, when executed, further causes the at least one computing device to at least determine an argument of a particular one of the plurality of instructions using backward slicing and forward constant propagation.

12. The system of claim 4, wherein the application is an Objective-C application, the first listing of classes is determined from an "$\_\_{objc}\_$classrefs" section, and the first listing of methods is determined from an "_objc_selrefs" section.

13. The system of claim 4, wherein the data identifying the plurality of public API definitions comprises a plurality of header files associated with the plurality of public API definitions.

14. The system of claim 4, wherein individual ones of the plurality of public API definitions include a plurality of class names, a plurality of method names, and a plurality of argument lists.

15. A method, comprising:
- analyzing, by at least one computing device, binary code of an application to determine a first listing of classes and a first listing of methods, wherein the first listing of classes includes local classes but not external classes, and the first listing of methods includes local methods but not external methods;
- analyzing, by the at least one computing device, metadata of the application to determine a second listing of classes and a second listing of methods, wherein the second listing of classes includes at least one local class and at least one external class, and the second listing of methods includes at least one local method and at least one external method;
- determining, by the at least one computing device, a listing of external classes from the first listing of classes and the second listing of classes;
- determining, by the at least one computing device, a listing of external methods from the first listing of methods and the second listing of methods;
- obtaining, by the at least one computing device, data identifying a plurality of public application programming interface (API) definitions; and
- determining, by the at least one computing device, a plurality of public APIs invoked by the application by comparing the listing of external classes and the listing of external methods with the data identifying the plurality of public API definitions.

16. The method of claim 15, further comprising determining, by the at least one computing device, by forward constant propagation, a plurality of instructions of the application that invoke respective ones of the plurality of public APIs by way of a proxy function.

17. The method of claim 16, further comprising stopping, by the at least one computing device, the forward constant propagation in response to determining that a current operand containing a particular constant is overwritten by another variable or in response to reaching a last instruction of a current function.

18. The method of claim 16, further comprising determining, by the at least one computing device, an argument of a particular one of the plurality of instructions using backward slicing and forward constant propagation.

19. The method of claim 16, wherein the proxy function corresponds to a message-passing function.

* * * * *